United States Patent [19]

Smirnov

[11] Patent Number: 6,022,479
[45] Date of Patent: Feb. 8, 2000

[54] METHOD AND DEVICE FOR PRODUCING ACTIVATED LIQUIDS AND METHODS OF USE THEREOF

[76] Inventor: Igor Smirnov, 3375 Calle Odessa, Carlsbad, Calif. 92009

[21] Appl. No.: 09/120,789

[22] Filed: Jul. 22, 1998

[51] Int. Cl.$^7$ .................................................. B01P 35/06
[52] U.S. Cl. .................. 210/695; 210/748; 210/143; 210/222; 210/223; 204/157.15; 204/554; 204/557; 204/660; 204/667; 422/186.01; 426/237; 426/247; 426/248
[58] Field of Search ................... 204/157.15, 554, 204/557, 660, 664; 210/695, 748, 143, 222, 223; 422/186.07; 426/237, 238, 247, 248

[56] References Cited

U.S. PATENT DOCUMENTS

| | | |
|---|---|---|
| 5,500,009 | 3/1996 | Mendes et al. . |
| 5,514,283 | 5/1996 | Stefanini . |
| 5,683,436 | 11/1997 | Mendes et al. . |
| 5,702,432 | 12/1997 | Chen et al. . |
| 5,804,068 | 9/1998 | Reed ........................................ 210/222 |
| 5,891,331 | 4/1999 | Yang ........................................ 210/222 |

*Primary Examiner*—David A. Reifsnyder
*Attorney, Agent, or Firm*—Brown, Martin, Haller & McClain

[57] ABSTRACT

A device and method are disclosed which activate aqueous liquids, particularly water, and liquid polymers, resulting in enhanced properties in chemical and biological processes in which the activated liquids are used. The device includes a liquid reservoir; an activation body formed of a polymeric matrix containing a number of finely divided materials, with the body disposed in a strong (2,500–25,000 Oersted) magnetic field and responsive to visible electromagnetic radiation having a frequency of 7.2–7.8 Hz and a wavelength of 400–800 nm, and with one end disposed proximate to the surface of the liquid; and an electrical circuit adjacent the other end of the body, activating diodes to emit flashes of light having that wavelength and frequency, so that the materials and the polymeric body are energized and emit low frequency oscillations, which activate the liquid contained in the reservoir. Polymers include polyurethanes and epoxies. Materials include metals, metal salts, organic compounds, and natural minerals and mineral containing bodies. Concentrations are in the range of 0.04–30 parts by weight per 100 parts by weight of polymer. Also described are a number of methods of use of activated liquids, particularly water, including reducing alkalinity, acidity or hardness of water, reducing bacterial content of contaminated water, enhancing the setting time and compressive strength of concrete, and enhancing the growth rate and viability of plants. Physiological effects on cells and viruses as well as in humans have been observed with water activated as described.

23 Claims, 3 Drawing Sheets

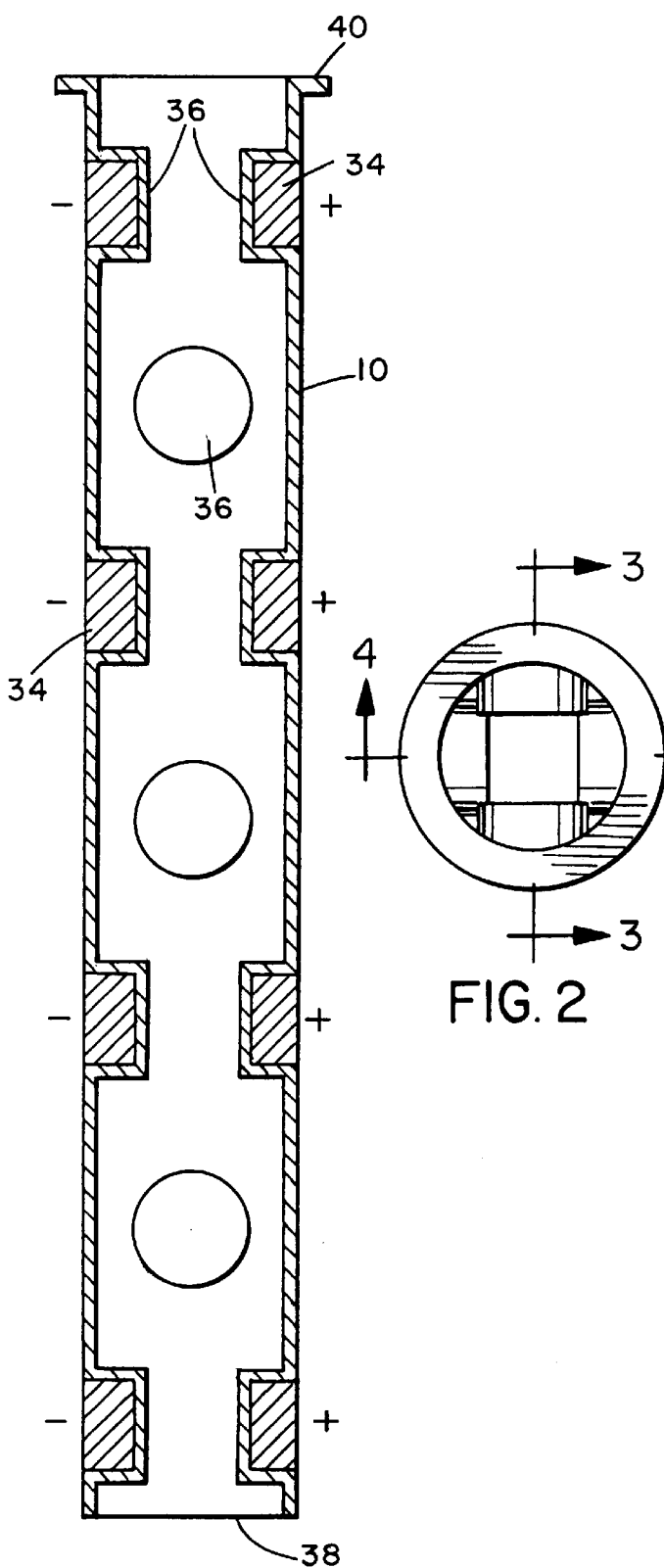
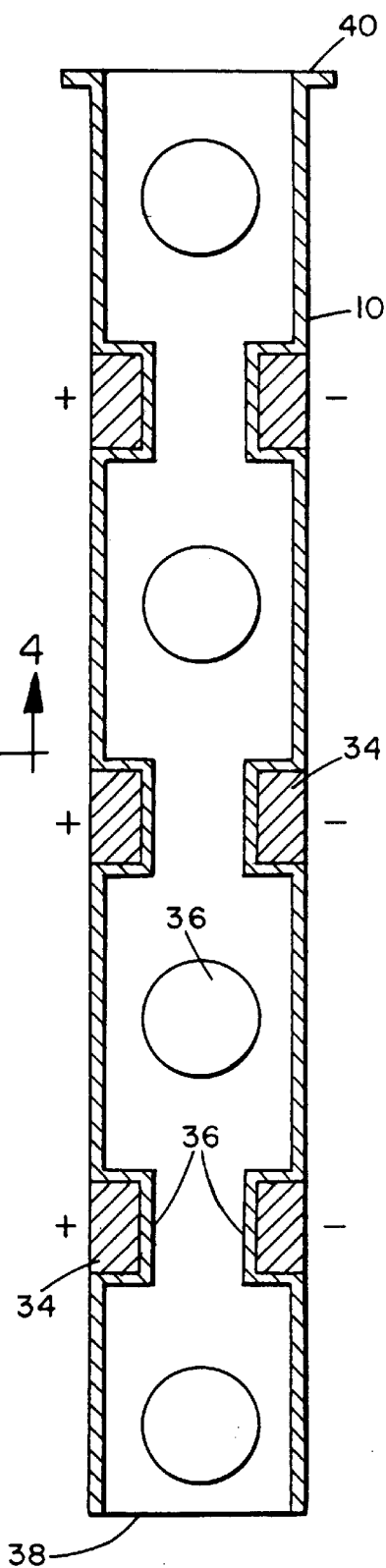
FIG. 2
FIG. 3
FIG. 4

METHOD AND DEVICE FOR PRODUCING ACTIVATED LIQUIDS AND METHODS OF USE THEREOF

BACKGROUND OF THE INVENTION

1. Field of the Invention

The invention herein relates to activated liquids, such as water and liquid polymers, having exceptional chemical and physiological properties. More specifically, it relates to the method of production of activated liquids, to a device for such production, and to methods of using the activated liquids to obtain the benefits of the enhanced properties.

2. Description of the Prior Art

Water is a critical factor in most chemical and biological processes. It has been known that water quality can have a significant effect upon those processes. Therefore, considerable time and effort has been spent to purify water from various sources. Such purification processes, while useful, merely remove much of the dissolved and suspended foreign matter in water, but do not alter the nature of the water itself. While this is of advantage in reducing the opportunities for the foreign materials to adversely affect the chemical and biological processes, such purification techniques do not overcome the fundamental limitation that the water itself imposes on the process.

No process has previously been known which can alter the water itself, so that enhanced properties of altered water can advantageously be used to improve the basic functions of the chemical and biological processes in which the altered water would be used.

Similarly, liquid polymers are routinely used to manufacture a wide variety of products. The liquid polymers are carefully produced and transported to insure that contaminants do not get into the polymeric liquids before the liquids are used for production of such products. It is well known that if there are contaminants in the polymeric raw materials, the plastic products made (usually by molding) from the contaminated raw materials will be substandard and may be susceptible to breakage, dimensional distortion, and many other defects. However, as with water, while much effort has gone into producing pure polymers, there has been no process for altering the properties of the polymers themselves.

SUMMARY OF THE INVENTION

I have now developed a device and method which alters liquids, specifically aqueous liquids, preferably water, and liquid polymers, by activating them. These liquids when activated with the device and using the method described and claimed herein develop distinctively enhanced properties which are beneficial in numerous chemical and biological processes in which the activated liquids are used in place of some or all of the normal water or liquid supply. Enhancement is in the form of improved results from the processes, as compared to the same processes when performed with non-activated water or liquid polymer.

For example, the device and method of this invention have been used successfully to reduce alkalinity, acidity or hardness of water, reduce bacterial content of contaminated water, enhance the setting time and compressive strength of concrete, and enhance the growth rate and viability of plants. There is also limited indication that ingesting activated water may have advantageous physiological effects on humans, including but not limited to treatment of viral infections and dysmenorrhea.

Key to the present invention is an activation device which includes a polymeric body into which are incorporated small quantities of inorganic and organics materials, those materials when placed in a strong magnetic field being responsive to electromagnetic radiation having a particular range of frequency and wavelength. When this device irradiates a body of the target liquid through operation under the defined conditions of magnetic field strength and radiation frequency and wavelength, the liquid becomes activated. The activated liquid can then be used an a partial or complete substitute for non-activated liquid in numerous industrial chemical and biochemical reactions. Such use has been found to improve the efficiency of such reactions.

Therefore, in one broad embodiment the invention is of a device for the production of activated liquids which comprises a liquid reservoir and an activation member, the activation member comprising an elongated column having first and second axial ends and an annular wall having an exterior and enclosing a hollow interior of the column, the first end projecting toward the reservoir and the second end being disposed outside the reservoir, at least one magnet pair disposed along the exterior of the column, the two magnets of each pair being disposed opposite each other across the column, the at least one magnet pair generating a magnetic field in the range of 2,500–25,000 Oersteds, a polymeric composition filing the interior of the column, the polymeric composition comprising a polymer having a linear chain length of at least 38 monomer units and having dispersed therein, in finely divided form, 0.04–30 parts by weight per 100 parts by weight of polymer of a mixture of materials selected from at least two of the groups of (a) metals and metal salts comprising metals, oxides, nitrates, sulfates or tartrates of Groups 1a, 3a, 4a, 5a, 5b, 6b and 8b elements, (b) silicates and carbonates, (c) inorganic acids, (d)aminoaldehydes and pyridines, and (e) analgesics; the materials being responsive to electromagnetic radiation having a frequency in the range of 7.2–8.2 Hz and a wavelength in the range of 400–800 nm; and an electrical circuit disposed adjacent to the second end of the column, the circuit including a light emitting member which emits flashes of light having a wavelength in the range of 400–800 nm at a frequency of in the range of 7.2–8.2 Hz, the emitted flashes of light being directed at the second end of the column; such that when the reservoir contains a liquid and the electrical circuit operates and causes the light emitting member to flash at the wavelength and frequency, and the materials in the polymer are subject to the magnetic field, the polymer and minerals become energized and emit low frequency oscillations which causes the liquid to become and remain activated.

In another broad embodiment the invention is of a method of activating a liquid which comprises providing a liquid reservoir and an activation member, the activation member comprising an elongated column having first and second axial ends and an annular wall having an exterior and enclosing a hollow interior of the column, the first end projecting into the reservoir and the second end being disposed outside the reservoir, at least one magnet pair disposed along the exterior of the column, the two magnets of each pair being disposed opposite each other across the column, the at least one magnet pair generating a magnetic field in the range of 2,500–25,000 Oersteds, a polymeric composition filing the interior of the column, the polymeric composition comprising a polymer having a linear chain length of at least 38 monomer units and having dispersed therein, in finely divided form, 0.04–30 parts by weight per 100 parts by weight of polymer of a mixture of materials selected from at least two of the groups of (a) metals and metal salts comprising metals, oxides, nitrates, sulfates or tartrates of Groups 1a, 3a, 4a, 5a, 5b, 6b and 8b elements, (b) silicates and carbonates, (c) inorganic acids, (d) aminoaldehydes and pyridines, and (e) analgesics; the materials being responsive to electromagnetic radiation having a frequency in the range of 7.2–8.2 Hz and a wavelength in the range of 400–800 nm; and an electrical circuit disposed adjacent to the second end of the column, the circuit including a light emitting member which emits flashes of light having a wavelength in the range of 400–800 nm at a frequency of in the range of 7.2–8.2 Hz, the emitted flashes of light being directed at the second end of the column; subjecting the polymer and incorporated materials in the activation member to the magnetic field of 2,500–25,000 Oersteds from the at least one magnet pair; positioning the first end of the activation element proximate to the liquid in the reservoir while maintaining the magnetic field; operating the electrical circuit to cause the light emitting member to flash at the wavelength and frequency; whereby the materials and polymer become energized and emit low frequency oscillations which causes the proximate liquid in the reservoir to become and remain activated.

In a particularly preferred embodiment, the materials which are incorporated into the polymer in the activation device are responsive to electromagnetic radiation having a frequency on the order of 7.8 Hz and a wavelength on the order of 585 nm.

Other embodiments and details will be described below.

BRIEF DESCRIPTION OF THE DRAWINGS

FIG. 2 is a top view of the column on which magnets are mounted and in which a polymeric composition containing finely divided minerals and compounds which cause the activation is housed.

FIGS. 3 and 4 are cross-sectional elevation views of the column taken, respectively, on Lines 3—3 and 4—4 of FIG. 2.

DETAILED DESCRIPTION AND PREFERRED EMBODIMENTS

Figure 1:
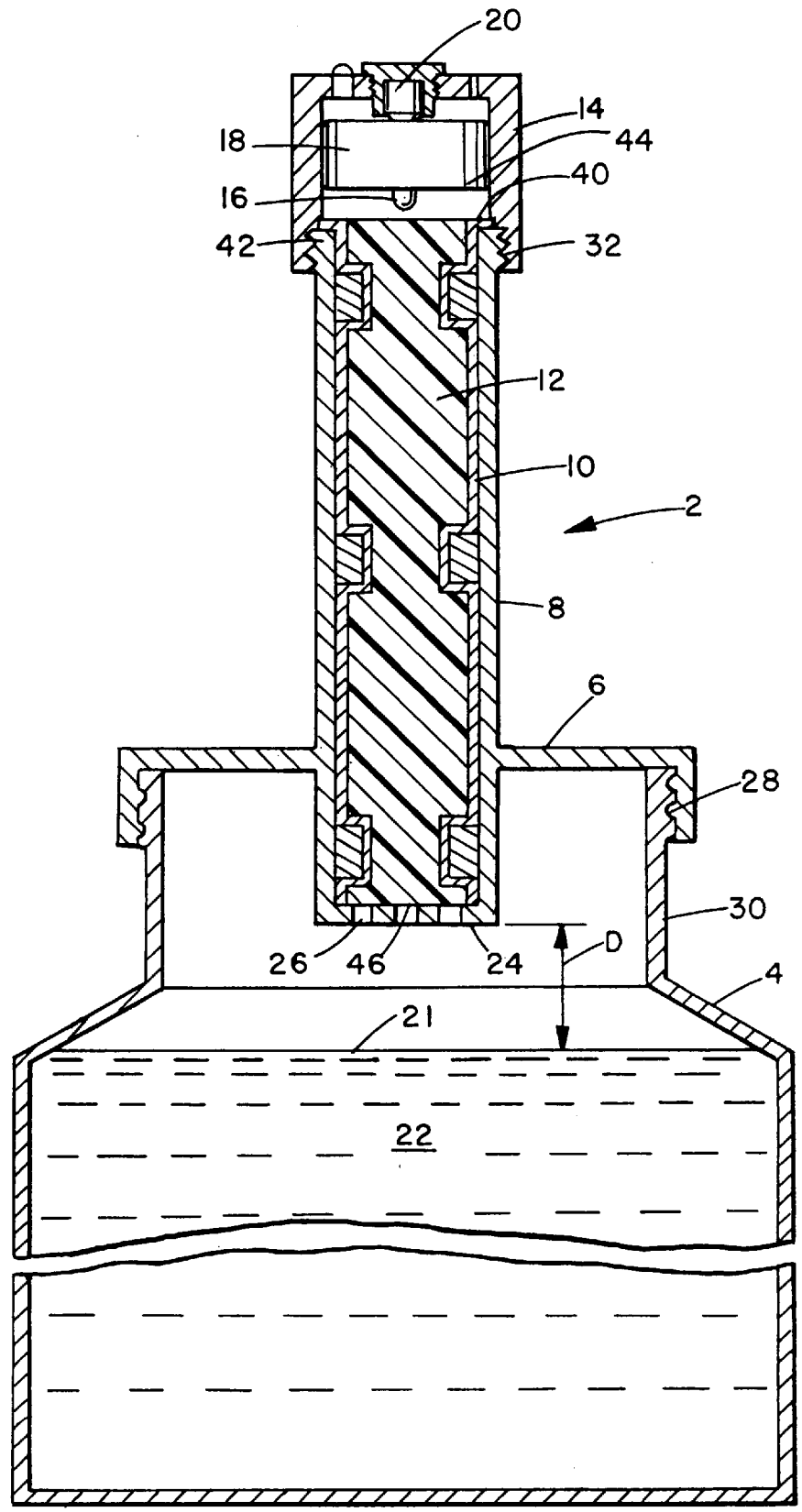
FIG. 1 is a cross-sectional center line elevation view of a water reservoir on which is mounted a novel water activation device of the present invention.

The invention is best understood initially by reference to the drawings. Considering first FIG. 1, the device 2 of the present invention is made up of a liquid reservoir 4, a cap 6 which includes a vertical housing 8 in which the column 10 containing a unique "filled" or 'impregnated" polymer body 12 is encased, and a removable chamber 14 which is attached to housing 8 and which contains radiation emitting diodes 16 and an electrical circuit 18 to activate the diodes. In the top of the chamber 14 is a socket 20 for a battery which is used to power the circuit 18. Socket 18 can also be adapted to be a receptacle for an external electrical power line which leads to an external source of low voltage DC power (not shown). The latter configuration will be of advantage for an activating device which is intended to be at least semi-permanently disposed in a fixed location, and will avoid the necessity to regularly replace batteries for the device.

To use the device, as shown in FIG. 1, the reservoir 4 is largely filled with liquid 22, which is normally in at least a moderately pure state. It is preferred to use thoroughly purified liquid in the reservoir 4, so that foreign materials in the liquid will not adversely affect or retard the activation process. However, as will be exemplified below, activation itself will serve to purify the liquid to a certain extent.

The liquid to be activated will be an aqueous liquid, preferably water, or a liquid polymer. For brevity herein, the invention will be exemplified in the discussion below by water as the liquid to be activated. It will be understood, however, that the invention is not limited only to activation of water but also applies to the activation of other aqueous liquids and liquid polymers.

The lower end 24 of casing 8 contains openings 26 to allow the body 12 to emit low frequency oscillations toward the water 22. Casing 8 is positioned with its lower end 24 facing toward the water surface 21 and disposed such that the distal end 46 of the polymeric body 12 is spaced apart from the water surface 21 by a distance D of at least about 1" (2.5 cm). The cap 6 is removably mounted by mating screw threads 28 to the top neck 30 of reservoir 4 so that it can be easily unscrewed to fill or empty the reservoir. Similarly, the chamber 14 is attached by mating screw threads 32 to the upper end of housing 8 so that it can be removed to permit access to the interior of housing 8 for insertion, removal or replacement of the column 10. In addition, removal of chamber 14 allows access to the diodes 16 and circuitry 18 for maintenance or repair.

The column which houses the polymeric body is best illustrated in FIGS. 2–4. These Figures show the column 10 with magnets 34 in place but with the polymeric body 12 removed so that the interior of the column 10 can be observed. Formed in the side walls of column 10 are laterally opposed pairs of cylindrical recesses 36 in which magnets 34 are seated. In the embodiment shown there are seven pairs of magnets 34, but the number of magnet pairs may be any number from one to ten or more. The number of magnet pairs will be selected so that the total magnetic field generated is in the range of 2,500–25,000 Oersteds. The magnet pairs may be replaced by electromagnets which provide magnetic induction of about 4000 gauss for each magnet, to produce an equivalent magnetic field. The magnet pairs are disposed so that the north-south orientation of the poles are reversed from pair to pair, such that each pair has the opposite north-south alignment as the adjacent pairs on either side of it, as indicated by the + and − signs in FIGS. 3 and 4. The lower end 38 of the column 10 is open so that when the polymeric body 12 is present it can emit low frequency oscillations toward the water 22 at the lower end of the column 10. The top end of the column 10 is formed with an annular flange 40 which in use rests on and is supported by the top end 42 of housing 8.

Figure 5:
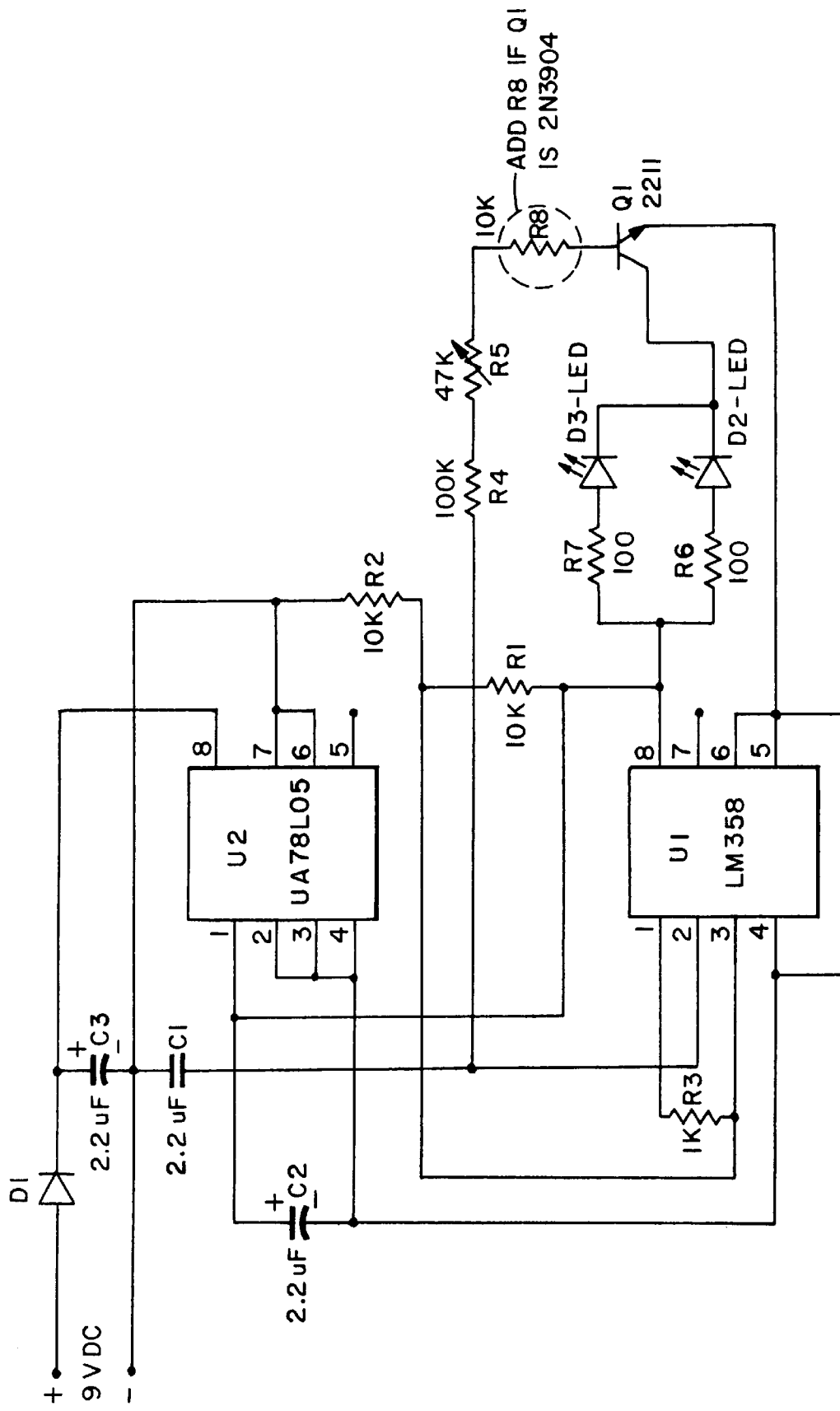
FIG. 5 is a schematic diagram of an electrical circuit which produces radiation flashes or pulses at the wavelength and frequency critical to this invention.

The electrical circuit 18 is shown schematically in FIG. 5. Each of the components is identified with conventional standard symbols in FIG. 5 and is labeled with representative values for its properties, such that no further description is needed. Those skilled in the art will also of course recognize that standard component substitutions can be made, as long as the changes do not materially affect the ability of the diodes to flash with the critical frequency and wavelength which will be discussed below. The circuit is normally powered by a 9V battery which is seated in socket 20 and makes contacts with the contacts 44 of circuit 18. The circuit 18 is designed to cause the diodes 16 to emit visible light radiation at a visible wavelength $\lambda$ in the range of 400–800 nm and a frequency in the range of 7.2–8.2 Hz. In a preferred embodiment the visible wavelength $\lambda$ is on the order of 585 nm and has a frequency on the order of 7.8 Hz.

These values for frequency and wavelength of the light radiation emitted from the diodes 16 and the magnetic field to which the polymer and materials are simultaneously subjected are critical to the present invention, since the polymeric body 12 and its contained materials are particularly responsive to these frequencies and wavelengths of the radiation while in the magnetic field, and, in turn, resonate to provide the activating energy to the body of water 22. The specific predominant frequency, wavelength and magnetic field will be dependent upon the liquid to be activated and the purpose for which it is to be activated. For instance, for suppression of bacteria in water a magnetic field of about 2,500 Oersteds, a predominant wavelength of about $\lambda=585$ nm (a yellow-green color) and a predominant frequency of about 7.8 Hz was found to be quite suitable.

While applicant does not wish to be bound by any particular theory for the mechanism of the present invention, it is believed that the criticality of the 7.2–8.2 Hz frequency, with preferably 7.8 Hz predominant, is related to the fact that 7.8 Hz is a basic frequency of the earth's magnetic field, known as the Shuman frequency. As will be mentioned below, the activating ability of the present device is believed to be related to the earth's natural magnetic field.

The polymeric body 12 is composed of a polymer matrix in which the polymer has a linear chain length of at least 38 monomer units. Both thermosetting and thermoplastic polymers may be used. It is preferred to use polymers which possess comparatively high values of relative permittivity (dielectric constant), since that provides for easier displacement of both bonding and non-bonding electrons in these polymers by the external magnetic field and thus enhanced continuity with the electromagnetic and optical response of the incorporated materials. The polymers selected must, however, be capable of absorbing visible light radiation (v=400–800 nm); absorption of optical (visible) radiation occurs in the polymers by irreversible non-radiative loss effects. Polymers which exhibit this capability include polyurethanes, epoxies and furans. Polyurethane resins are well known polymers and are widely described in the literature. Typical descriptions can be found in Mark et al. (eds.), KIRK-OTHMER CONCISE ENCYCLOPEDIA OF CHEMICAL TECHNOLOGY, "Urethane Polymers", pp. 1211–1212 (1985); Rubin (ed.), HANDBOOK OF PLASTIC MATERIALS AND TECHNOLOGY, chs. 41 and 42, pp. 501–524 (1990); and Juran (ed.), *Modern Plastics Encyclopedia* 88, 64:10A, pp. 97–98, 122,124, 546 (October 1987). Similarly, epoxy polymers can be found described in many references, including the aforementioned Mark et al. (eds.), KIRK-OTHMER CONCISE ENCYCLOPEDIA OF CHEMICAL TECHNOLOGY, "Epoxy Resins", pp. 431–433 (1985); Rubin (ed.), HANDBOOK OF PLASTIC MATERIALS AND TECHNOLOGY, ch. 72, pp. 829–844 (1990); and Juran (ed.), *Modern Plastics Encyclopedia* 88, 64:10A, pp. 114, 516–517 (October 1987). Also, furan (or furfuyl) polymers can be found described in many references, including the aforementioned Mark et al. (eds.), KIRK-OTHMER CONCISE ENCYCLOPEDIA OF CHEMICAL TECHNOLOGY, "Furan Derivatives", pp. 542–544 (1985).

Incorporated throughout (i.e., impregnated or filled into) the body of the polymer resin matrix, in finely divided form, are a number of different materials, all selected so that the polymeric activation body containing these materials when subjected to the 2,500–25,000 Oersteds magnetic field responds to the 7.2–8.2 Hz frequencies and 400–800 nm wavelengths of the emitted light and resonates to produce electromagnetic oscillations of low frequency which enhance and intensify the normal coronal discharge of the incorporated materials within the polymeric matrix. The frequency of these resultant oscillations are generally in the range of 0.5–5.0 Hz.

The incorporated materials are selected from several classes of compounds, of which at least two classes must be dispersed in the impregnated or filled polymer, in finely divided form, and at a concentration of from 0.04–30 parts by weight per 100 parts by weight of polymer, to form the activating body. These classes of compounds are (a) metals and metal salts comprising metals, oxides, nitrates, sulfates or tartrates of Groups 1a, 3a, 4a, 5a, 5b, 6b and 8b elements; (b) silicates and carbonates; (c) inorganic acids; (d) aminoaldehydes and pyridines, and (e) analgesics. Specific examples of various mixtures of compounds will be described below. The specific mixture of compounds and their precise concentrations will vary according to the liquid to be activated and the use to which the activated liquid is subsequently to be put. It will, however, from the information herein, be well within the ability of a person of ordinary skill in the art to select the appropriate mixture of materials for the specific task intended by such person, with no more than routine minor experimentation.

It will be recognized that the selection of these materials and their concentration in the polymeric matrix will be a function of their ability to participate in the resonance and to have their normal coronal discharge energies intensified by the resonance effect in the 7.2–8.2 Hz frequency range and 400–800 nm wavelength range. The person skilled in the art will also be able readily to determine the appropriate frequency and wavelength, again with only routine experimentation, for optimum performance of the task intended for the activated liquid.

The metals and metals salts which have been found useful in this invention are the metals, oxides, nitrates, sulfates or tartrates of elements of Groups 1a, 3a, 4a, 5a, 5b, 6b and 8b, preferably aluminum, antimony, boron, chromium, iron, lead, nickel, niobium, osmium or potassium.

Also included in the polymeric matrix are a number of different minerals, which also are selected for their ability to undergo resonant intensification of their coronal discharge. These may include materials from the calcite family, quartz family and jade family, as well as from shells of marine organisms, which are primarily carbonates and silicates of elements such as calcium, copper, sodium and aluminum, as well as various forms of silica itself.

The third class of compounds useful herein are the inorganic acids. Most preferred are the weaker inorganic acids (pH $\geq 3.0$, preferably $\geq 4.5$), such as boric acid (pH= 5.2).

The fourth class of compounds for the present invention are organic aminoaldehydes and pyridines.

Finally, the fifth class of compounds are those which have an analgesic physiological effect.

The various compounds selected from at least two of the five classes will be present in a total concentration of approximately 0.04–30 parts by weight per 100 parts by weight of the polymeric matrix. (Unless otherwise noted, all concentrations mentioned herein in the Specification and claims are stated in parts by weight of a named material per 100 parts by weight of the polymeric matrix.) It will be recognized that the various concentrations of the individual compounds can be varied to obtain the total defined concentration range as long as the resonant response of the filled polymeric body 12 to the 7.2–8.2 Hz frequency and 400–800 nm wavelength is maintained when the body is in the strong magnetic field provided by the magnet pairs.

The following examples will illustrate specific embodiments of the present invention, with the end use applications for which each is particularly preferred.

EXAMPLE 1

The polymer was a polyurethane polymer, into which were incorporated the following materials at the stated concentrations. For the mineral materials the predominate chemical in the mineral is indicated.

| Material | Concentration, parts |
|---|---|
| antimony potassium tartrate | 1.3 |
| chromium potassium sulfate | 1.6 |
| lead oxide | 0.4 |
| boric acid | 4.2 |
| aluminum sulfate | 1.2 |
| nickel nitrate | 1.6 |
| ferric oxide | 6.2 |
| calcite [$CaCO_3$] | 0.3 |
| malachite [$Cu_2CO_3(OH)_2$] | 0.3 |
| quartz [$SiO_2$] | 1.3 |
| agate [$SiO_2$] | 0.3 |
| carnelian [$SiO_2$] | 3.2 |
| amethyst [$SiO_2$] | 0.2 |
| citrine [$SiO_2$] | 1.3 |
| nephrite or jade [$Ca_2Mg_5(Si_8O_{22})(OH)_2$ | 2.2 |
| opal [$SiO_2 \cdot _{nH2O}$] | 0.4 |
| Total parts | 26.0 |

Water activated with this mixture was found excellent for use for enhancing setting of concrete and removal of bacteria from contaminated water, as well as for rejuvenation of healthy cells. There was also some indication that the water so activated could suppress growth of certain tumor cells.

EXAMPLE 2

The polymer was an epoxy polymer, into which were incorporated the following materials at the stated concentrations. For the natural materials the predominate chemical in the material is indicated.

| Compound | Concentration, parts |
|---|---|
| boric acid | 0.12 |
| nickel nitrate | 0.14 |
| 2-dimethylaminoethanal | 0.02 |
| pyridoxine HCl | 0.04 |
| acetaminophen | 0.05 |
| Atlantic Cowrie shell [$CaCO_3$] | 0.08 |
| Total parts | 0.45 |

Water activated with this filled polymer was found to suppress cellular and viral activity.

EXAMPLE 3

The polymer was an epoxy polymer, into which were incorporated the following materials at the stated concentrations. For the natural materials the predominate chemical in the material is indicated

| Compound | Concentration, parts |
|---|---|
| 2-dimethylaminoethanal | 0.30 |
| pyridoxine HCl | 0.06 |
| acetaminophen | 0.07 |
| Atlantic Cowrie shell [$CaCO_3$] | 0.12 |
| niobium metal | 0.002 |
| osmium metal | 0.003 |
| Total parts | 0.555 |

Water activated with this filled polymer was found to act as a fungicide.

Other examples of beneficial end uses of the present invention will be described below.

The device may be constructed in any convenient size. For instance, I have found that a device in which the column 10 is approximately 8" high by 1" in diameter (20×2.5 cm) and the reservoir 4 is approximately 6½" high by 3½" in diameter (16×9 cm), with a liquid volume of approximately 2 pints (1 liter), is quite satisfactory for making small amounts of activated liquid, especially water.

The device of the present invention is operated by activating the electrical circuit 18 by connection to a battery or adapter in socket 12. An off-on switch (not shown) can be provided if desired. The electrical circuit 18 then causes the diodes 16 to emit radiation in the 400–800 nm frequency range with a wavelength in the 7.2–8.2 nm range. Of course the specific frequency and wavelength will be determined by the values of the components on the circuit. Those skilled in the art of circuit design will be readily able to select the appropriate values for the components of a circuit equivalent to that shown in FIG. 5, in order to obtain the frequency and wavelength values desired. The flashing light emitted by the diodes 16 is directed toward the adjacent end 44 of the polymeric body 12. The response of the body 12 and its incorporated materials to the light is resonant, and under such resonance the body 12 in turn emits the aforementioned low frequency radiation from its distal end 46 toward the body of water 22 in the reservoir 4. This continues for a period of time (usually 30–45 minutes) until the proton dispersion in the water reaches an increased value in the range of about 3.4–6.2 ppm. That range has been found to indicate when treated water can be considered to be adequately activated.

Other improved water properties produced by the activation of this invention have been observed. For instance, in one experiment after 30 minutes of activation calcium content decreased by 72% and magnesium content decreased by 18%, thus reducing the hardness (combined Ca and Mg reduction) of the water by 45%. Similarly, 15 minutes of activation of alkaline water (pH=7.69) reduced the pH to 7.48, a 30% reduction alkalinity as compared to neutral water pH°=7.0. In another experiment a reduction of pH from 7.65 to 7.25 (62% reduction in alkalinity) was observed after 30 minutes of activation. Similarly, acidity of water is also reduced by activation. In an experiment after 15 minutes of activation the pH of acidic water was increased from 6.73 to 6.89 (a 35% increase relative to neutral water pH°=7.0). Finally, water activated for 30 minutes in another experiment showed a 3% increase in conductivity.

The following are examples of the beneficial and heretofore unknown effects of the activation of the water by the present process.

EXAMPLE 4

Enhanced Soy Bean Growth

Two groups of common soy beans were divided into a test group and a control group, each with about 20 beans. The test group was irrigated with activated water produced in accordance with the description of the process herein. The control group was irrigated with regular, non-activated water. Except for the activation, the waters were otherwise equivalent. Similarly, equivalent methods and times of irrigation with the test waters were used for both groups of beans. All other factors related to the growth test were maintain equivalent during the course of the experiment. After 15 days only 7 of the 20 control group beans had sprouted, and the average sprout length was about 4" (10 cm). In contrast, after the same period, 13 of the 20 test beans had sprouted, with a maximum sprout length of 9" (23 cm).

EXAMPLE 5

Enhanced Concrete Setting and Strength

Comparative tests of concrete samples made with activated water and normal water were made by a construction industry consultant. Normal concrete compositions and mixing and setting procedures were used, with the exception of the substitution of the activated water in one half of the samples. One test showed that after 7 days concrete made from the activated water had 11% higher compressive strength than the control, normal water concrete, while a subsequent 8 day test with other samples showed a 36% improvement in compressive strength in the activated sample.

EXAMPLE 6

Bacterial Reduction in Contaminated Water

Laboratory tests of bacteria-contaminated water showed that activation could reduce the level of harmful bacteria substantially. For instance, activation of contaminated rain water for 30 minutes in one test resulted in an 86% reduction in total and fecal coliforms in the water. In another test bacterial colonies in contaminated lake water were reduced by 44% after 15 minutes of activation.

EXAMPLE 7

Possible Physiological and Medical Effects

Several tests involving subjects diagnosed as having various cancers provided anecdotal evidence that ingestion of activated water in place of regular water over a 1–2 month period by such subjects reduced the debilitating effects of the cancers on the subjects' general health. Similarly, a woman suffering from apparent early menopause was reported to have resumed regular menstrual function after a two-week regimen of ingestion of activated water in place of regular water.

As noted, while applicant does not want to be bound to any specific mechanism, it is believed that the results found in experiments are consistent with a mechanism in which the activated water enhances the natural electromagnetic field of inorganic objects, which can be detected by Kirlian photography, and which is often referred to as the coronal discharge effect. The incorporation of the inorganic compounds and minerals in the polymeric matrix results in intensification of the effect by the resonance of the polymeric molecular chains to the visible ($\lambda$=400–800 nm) light radiation at the 7.2–7.8 Hz frequencies while the polymer is in the high intensity magnetic field within the column 10.

It will be evident from the above that there are other embodiments of the present invention which, while not expressly set forth above, are clearly within the scope and spirit of the invention. The disclosure above is therefore to be considered exemplary only, and the actual scope of the invention is to be determined solely by the appended claims.

I claim:

1. A device for the production of activated liquids which comprises:

a liquid reservoir and an activation member, said activation member comprising:

an elongated column having first and second axial ends and an annular wall having an exterior and enclosing a hollow interior of said column, said first end projecting toward said reservoir and said second end being disposed outside said reservoir, at least one magnet pair disposed along the exterior of said column, the two magnets of each pair being disposed opposite each other across said column, said at least one magnet pair generating a magnetic field in the range of 2,500–25,000 Oersteds;

a polymeric composition filing said interior of said column, said polymeric composition comprising a polymer having a linear chain length of at least 38 monomer units and having dispersed therein, in finely divided form, 0.04–30 parts by weight per 100 parts by weight of polymer, of a mixture of materials selected from at least two of the groups of:

a. metals and metal salts comprising metals, oxides, nitrates, sulfates or tartrates of Groups 1a, 3a, 4a, 5a, 5b, 6b and 8b elements;

b. silicates and carbonates;

c. inorganic acids;

d. aminoaldehydes and pyridines, and e. analgesics;

said materials being responsive to electromagnetic radiation having a frequency in the range of 7.2–8.2 Hz and a wavelength in the range of 400–800 nm; and an electrical circuit disposed adjacent to said second end of said column, said circuit including a light emitting member which emits flashes of light having a wavelength in the range of 400–800 nm at a frequency of in the range of 7.2–8.2 Hz, said emitted flashes of light being directed at said second end of said column;

such that when said reservoir contains a liquid and said electrical circuit operates and causes said light emitting member to flash at said wavelength and frequency, and said materials in said polymer are subject to said magnetic field, said polymer and materials become energized and emit low frequency oscillations which causes said liquid to become and remain activated.

2. A device as in claim 1 wherein said Groups 1a, 3a, 4a, 5a, 5b, 6b and 8b elements comprise aluminum, antimony, boron, chromium, iron, lead, nickel, niobium, osmium or potassium.

3. A device as in claim 1 wherein said silicates and carbonates are selected from the group consisting of quartz minerals, jade minerals, calcite minerals, and marine animal shells.

4. A device as in claim 1 wherein said polymer comprises an urethane polymer or an epoxy polymer.

5. A device as in claim 1 comprising a plurality of said magnet pairs having a combined field strength of 2,500–25,000 Oersteds.

6. A device as in claim 5 wherein said magnet pairs of said plurality are spaced at generally equal intervals along said column.

7. A device as in claim 6 further comprising each of said magnet pairs being aligned in polarity opposite to that of the adjacent magnet pairs.

8. A device as in claim 1 wherein said materials are responsive to electromagnetic radiation having a frequency on the order of 7.8 Hz and a wavelength on the order of 585 nm.

9. A device as in claim 1 wherein said activated liquid to be produced is an activated aqueous liquid.

10. A device as in claim 9 wherein said activated aqueous liquid to be produced is activated water.

11. A device as in claim 1 wherein said activated liquid to be produced is an activated liquid polymer.

12. A method of activating a liquid which comprises:
providing a liquid reservoir and an activation member, said activation member comprising:
an elongated column having first and second axial ends and an annular wall having an exterior and enclosing a hollow interior of said column, said first end projecting toward said reservoir and said second end being disposed outside said reservoir,
at least one magnet pair disposed along the exterior of said column, the two magnets of each pair being disposed opposite each other across said column, said at least one magnet pair generating a magnetic field in the range of 2,500–25,000 Oersteds;
a polymeric composition filing said interior of said column, said polymeric composition comprising a polymer having a linear chain length of at least 38 monomer units and having dispersed therein, in finely divided form, 0.04–30 parts by weight per 100 parts by weight of polymer, of a mixture of materials selected from at least two of the groups of:
a. metals and metal salts comprising metals, oxides, nitrates, sulfates or tartrates of Groups 1a, 3a, 4a, 5a, 5b, 6b and 8b elements;
b. silicates and carbonates;
c. inorganic acids;
d. aminoaldehydes and pyridines, and
e. analgesics;
said materials being responsive to electromagnetic radiation having a frequency in the range of 7.2–8.2 Hz and a wavelength in the range of 400–800 nm; and
an electrical circuit disposed adjacent to said second end of said column,
said circuit including a light emitting member which emits flashes of light having a wavelength in the range of 400–800 nm at a frequency of in the range of 7.2–8.2 Hz, said emitted flashes of light being directed at said second end of said column;
subjecting said polymer and dispersed materials in said activation member to said magnetic field of 2,500–25,000 Oersteds from said at least one magnet pair;
positioning said first end of said activation member proximate to said liquid in said reservoir while maintaining said magnetic field;
operating said electrical circuit to cause said light emitting member to flash at said wavelength and frequency;
whereby said materials and said polymer become energized and emit low frequency oscillations which causes said proximate liquid in said reservoir to become and remain activated.

13. A method as in claim 12 wherein said Groups 1a, 3a, 4a, 5a, 5b, 6b and 8b elements comprise aluminum, antimony, boron, chromium, iron, lead, nickel, niobium, osmium or potassium.

14. A method as in claim 12 wherein said silicates and carbonates are selected from the group consisting of quartz minerals, jade minerals, calcite minerals, and marine animal shells.

15. A method as in claim 12 wherein said polymer comprises an urethane polymer or an epoxy polymer.

16. A method as in claim 12 further comprising said activation member including a plurality of said magnet pairs having a combined field strength of 2,500–25,000 Oersteds.

17. A method as in claim 16 further comprising spacing said magnet pairs of said plurality at generally equal intervals along said column.

18. A method as in claim 17 further comprising aligning each of said magnet pairs in polarity opposite to that of the adjacent magnet pairs.

19. A method as in claim 12 wherein said first end of said activation element is disposed at least 1" (2.5 cm) from a nearest proximate surface of said liquid.

20. A method as in claim 12 further comprising selecting materials which are responsive to electromagnetic radiation having a frequency on the order of 7.8 Hz and a wavelength on the order of 585 nm.

21. A method as in claim 12 wherein said activated liquid to be produced is an activated aqueous liquid.

22. A method as in claim 21 wherein said activated aqueous liquid to be produced is activated water.

23. A method as in claim 12 wherein said activated liquid to be produced is an activated liquid polymer.

* * * * *